(12) United States Patent
Ohata et al.

(10) Patent No.: US 9,056,361 B2
(45) Date of Patent: Jun. 16, 2015

(54) LIQUID-QUALITY ADJUSTING APPARATUS, LIQUID-QUALITY ADJUSTING METHOD, AND WIRE ELECTRIC DISCHARGE MACHINING APPARATUS

(75) Inventors: Tamayo Ohata, Tokyo (JP); Tatsushi Sato, Tokyo (JP); Hironori Kuriki, Tokyo (JP); Hisakatsu Kawarai, Tokyo (JP); Jyunji Tanimura, Tokyo (JP); Takashi Yuzawa, Tokyo (JP)

(73) Assignees: Mitsubishi Electric Corporation, Tokyo (JP); RYODEN KOKI ENGINEERING CO., LTD., Aichi (JP)

( * ) Notice: Subject to any disclaimer, the term of this patent is extended or adjusted under 35 U.S.C. 154(b) by 256 days.

(21) Appl. No.: 13/516,339

(22) PCT Filed: Dec. 18, 2009

(86) PCT No.: PCT/JP2009/006995
§ 371 (c)(1),
(2), (4) Date: Jun. 15, 2012

(87) PCT Pub. No.: WO2011/074043
PCT Pub. Date: Jun. 23, 2011

(65) Prior Publication Data
US 2012/0255934 A1    Oct. 11, 2012

(51) Int. Cl.
  *B23H 1/10*    (2006.01)
  *B23H 7/10*    (2006.01)
(52) U.S. Cl.
  CPC ... *B23H 7/10* (2013.01); *B23H 1/10* (2013.01)
(58) Field of Classification Search
  CPC ................................. B23H 7/10; B23H 1/10
  USPC .............. 219/69.14, 69.17; 210/87, 137, 138, 210/143, 662
  See application file for complete search history.

(56) References Cited

U.S. PATENT DOCUMENTS

| 5,985,152 A | 11/1999 | Otaka et al. |
| 7,795,558 B2 | 9/2010 | Nakajima et al. |

(Continued)

FOREIGN PATENT DOCUMENTS

| JP | 1175129 U | 12/1989 |
| JP | 11286628 A | 10/1999 |

(Continued)

OTHER PUBLICATIONS

U.S. Non-Final Office Action dated May 2, 2013 issued in U.S. Appl. No. 13/513,709.

(Continued)

*Primary Examiner* — Thien S Tran
(74) *Attorney, Agent, or Firm* — Sughrue Mion, PLLC; Richard C. Turner (57) ABSTRACT

The liquid-quality adjusting apparatus of the present invention includes: a water purifying part that deionizes a machining liquid; an anticorrosive part that exchanges ions in the machining liquid with anticorrosive ions; a conductivity measuring part that measures a measured value of conductivity of the machining liquid; a storage part that stores in advance a first reference value and a second reference value which are an upper limit value and a lower limit value of conductivity applicable to machining, respectively, and a third reference value which is between the first reference value and the second reference value; and a control part that performs control on the basis of the reference values stored in the storage part and the measured value of the conductivity of the machining liquid measured by the conductivity measuring part.

4 Claims, 11 Drawing Sheets

(56) References Cited

U.S. PATENT DOCUMENTS

| | | | |
|---|---|---|---|
| 2004/0057037 A1* | 3/2004 | Ohishi et al. | 356/39 |
| 2004/0238417 A1 | 12/2004 | Arakawa et al. | |
| 2007/0289925 A1* | 12/2007 | Kawarai et al. | 210/681 |
| 2009/0057274 A1 | 3/2009 | Nakajima et al. | |
| 2010/0219164 A1* | 9/2010 | Kawarai et al. | 219/69.13 |

FOREIGN PATENT DOCUMENTS

| | | | |
|---|---|---|---|
| JP | 2002301624 A | 10/2002 | |
| JP | 2004358573 A | 12/2004 | |
| JP | 2009248247 A | 10/2009 | |
| WO | 2006126248 A1 | 11/2006 | |
| WO | 2007113906 A1 | 10/2007 | |
| WO | 2007113915 A1 | 10/2007 | |

OTHER PUBLICATIONS

International Search Report dated Mar. 9, 2010 issued in International Application No. PCT/JP2009/006995 (PCT/ISA/210).

Written Opinion dated Mar. 9, 2010 issued in International Application No. PCT/JP2009/006995 (PCT/ISA/237).

Office Action dated Aug. 15, 2013, issued by the United States Patent and Trademark Office in U.S. Appl. No. 13/513,709.

* cited by examiner

LIQUID-QUALITY ADJUSTING APPARATUS, LIQUID-QUALITY ADJUSTING METHOD, AND WIRE ELECTRIC DISCHARGE MACHINING APPARATUS

TECHNICAL FIELD

The present invention relates to extending the life of an anticorrosive resin for an iron-based material that is used in a wire electric discharge machining apparatus which uses water as a machining liquid.

BACKGROUND

In a wire electric discharge machining that uses water as a machining liquid, control of the conductivity of the machining liquid is essential to stably perform the machining. In order to control the conductivity of a machining liquid used for the wire electric discharge machining, a method of deionizing a machining liquid by using a water purifying resin is generally used.

However, an iron-based material is often used for work pieces, and when an iron-based metal such as die steel or tool steel is machined in a deionized machining liquid, the iron-based metal corrodes. Thus, there arises a problem that corrosion has an influence on the machining accuracy. For this reason, a method using anticorrosive ions has been known.

Patent literature 1 discloses a technology in which a column filled with an anticorrosive-ion exchange resin and a column filled with a water purifying resin are provided, and if the conductivity of a machining liquid is smaller than a predetermined value, all of the machining liquid flows into the column filled with the anticorrosive ion exchange resin; whereas if the conductivity of the machining liquid is larger than the predetermined value, some of the machining liquid flows into the column filled with the water purifying resin, and the remaining machining liquid flows into the column filled with the anticorrosive-ion exchange resin. Patent literature 2 discloses a technology in which a water purifying unit and an anticorrosive-ion generating unit are provided, similarly to patent literature 1, and when a value of a conductivity of a machining liquid is larger than a predetermined value, the machining liquid flows into the water purifying unit; whereas when the value of the conductivity is smaller than the predetermined value, the machining liquid flows into the anticorrosive-ion generating unit.

CITATION LIST

Patent Literature

Patent Literature 1: Japanese Patent Application Laid-Open No. 2002-301624
Patent Literature 2: International Publication No. WO 2006/126248

SUMMARY IF INVENTION

Technical Problem

In patent literature 1, although some of the machining liquid intermittently flows into the column filled with the water purifying resin according to the conductivity of the machining liquid, since the machining liquid always flows into the column filled with the anticorrosive ion exchange resin, the life of the anticorrosive-ion exchange resin is short. Thus, there arises problems such as increase in running cost, increase in a workload according to exchange, and reduce in productivity due to stop of the machine during exchange.

In patent literature 2, if the conductivity of the machining liquid is larger than the predetermined value, the machining liquid flows into the water purifying unit. Otherwise, the machining liquid flows into the anticorrosive ion generating unit. Therefore, while the machining liquid flows into the water purifying unit, the machining liquid does not flow into the anticorrosive ion generating unit. However, practically, a flow time of the machining liquid into the water purifying unit is not so long.

As a result, the machining liquid flows into the anticorrosive-ion generating unit for a long time. Therefore, there arises a problem that the life of a resin used in the anticorrosive-ion generating unit is short.

An object of the present invention is to extend the life of an anticorrosive resin by minimizing a flow time of a machining liquid into the anticorrosive resin while maintaining the anticorrosive function of the machining liquid, in consideration of the above-mentioned circumferences.

Means for Solving the Problem

The liquid-quality adjusting apparatus of the present invention includes: a water purifying part that deionizes a machining liquid; an anticorrosive part that exchanges ions in the machining liquid with anticorrosive ions; a conductivity measuring part that measures a measured value of conductivity of the machining liquid; a storage part that stores in advance a first reference value and a second reference value which are an upper limit value and a lower limit value of conductivity applicable to machining, respectively, and a third reference value which is between the first reference value and the second reference value; and a control part that performs control on the basis of the reference values stored in the storage part and the measured value of the conductivity of the machining liquid measured by the conductivity measuring part, such that if the conductivity of the machining liquid is larger than the first reference value, the machining liquid flows only into the water purifying part, if the conductivity of the machining liquid becomes smaller than the second reference value, the flow of the machining liquid into the water purifying part is stopped and the machining liquid is made flow only into the anticorrosive part, and if the conductivity of the machining liquid becomes larger than the third reference value, the flow of the machining liquid into the anticorrosive part is stopped.

Advantageous Effects of Invention

If the flow times of the machining liquid into the water purifying resin and the anticorrosive resin are controlled on the basis of the first, second, and third reference value such that the flow times becomes requisite minimums, it is possible to secure the flow times of the machining liquid into the anticorrosive resin for obtaining an anticorrosive effect on the iron-based material while securing the conductivity of the machining liquid appropriate for electric discharge machining Therefore, it is possible to extend the life of the anticorrosive resin.

DESCRIPTION OF EMBODIMENTS

First Embodiment

First, a principle of the present invention for performing control a flow of a machining liquid into an ion exchange resin configured of an anticorrosive resin using a positive-ion-type resin and a negative-ion-type resin together and a water purifying resin will be described with reference to FIGS. 1 and 2.

Figure 1:
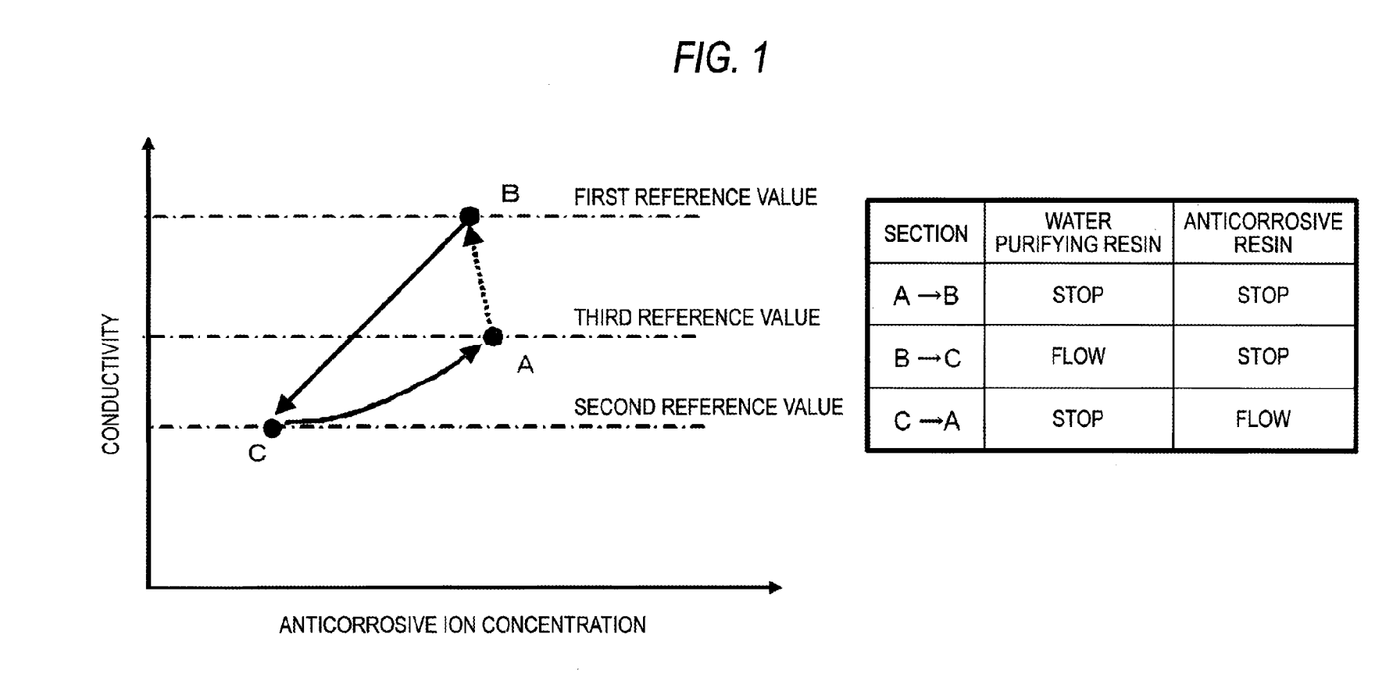
FIG. 1 is a view illustrating a relation between an anticorrosive ion concentration and conductivity.

FIG. 1 is a view illustrating a relation between an anticorrosive ion concentration and conductivity. In FIG. 1, a horizontal axis represents the anticorrosive ion concentration, and a vertical axis represents the conductivity.

Here, since positive ions that are supported by the positive-ion-type resin should have high solubility in water, and cations in water should be easily quantitated in water by a measuring instrument, it is preferable to use one of sodium ions ($Na^+$), potassium ions ($K^+$), and calcium ions ($Ca^{2+}$).

Further, as negative ions, $NO^{2-}$ is generally used; however, as long as an anticorrosive effect can be obtained, any other ions, for example, $MoO_4^{2-}$ or $WO_4^{2-}$ may also be used.

In FIG. 1, a state A represents a state in which the machining liquid does not flow into both the water purifying resin and the anticorrosive resin. As the conductivity gradually increases due to dissolution of carbon dioxide gas in the machining liquid, or the like, anticorrosive ions are slightly consumed. As a result, the machining liquid transitions from the state A to a state B.

In the state B in which the conductivity of the machining liquid is higher than a first reference value, if the machining liquid flows into the water purifying resin, the machining liquid is deionized by the water purifying resin, such that both of the anticorrosive ion concentration and conductivity of the machining liquid are reduced. As a result, the machining liquid becomes a state C in which the conductivity is lower than a second reference value.

In the state C, if the machining liquid is stopped from flowing into the water purifying resin and flows into the anticorrosive resin, ions in the machining liquid are exchanged with the anticorrosive ions by the anticorrosive resin. Therefore, the conductivity increases, and the anticorrosive ion concentration also increases. Then, if the conductivity becomes higher than a third reference value, the machining liquid is stopped from flowing into the anticorrosive resin, and returns to the state A.

Figure 2:
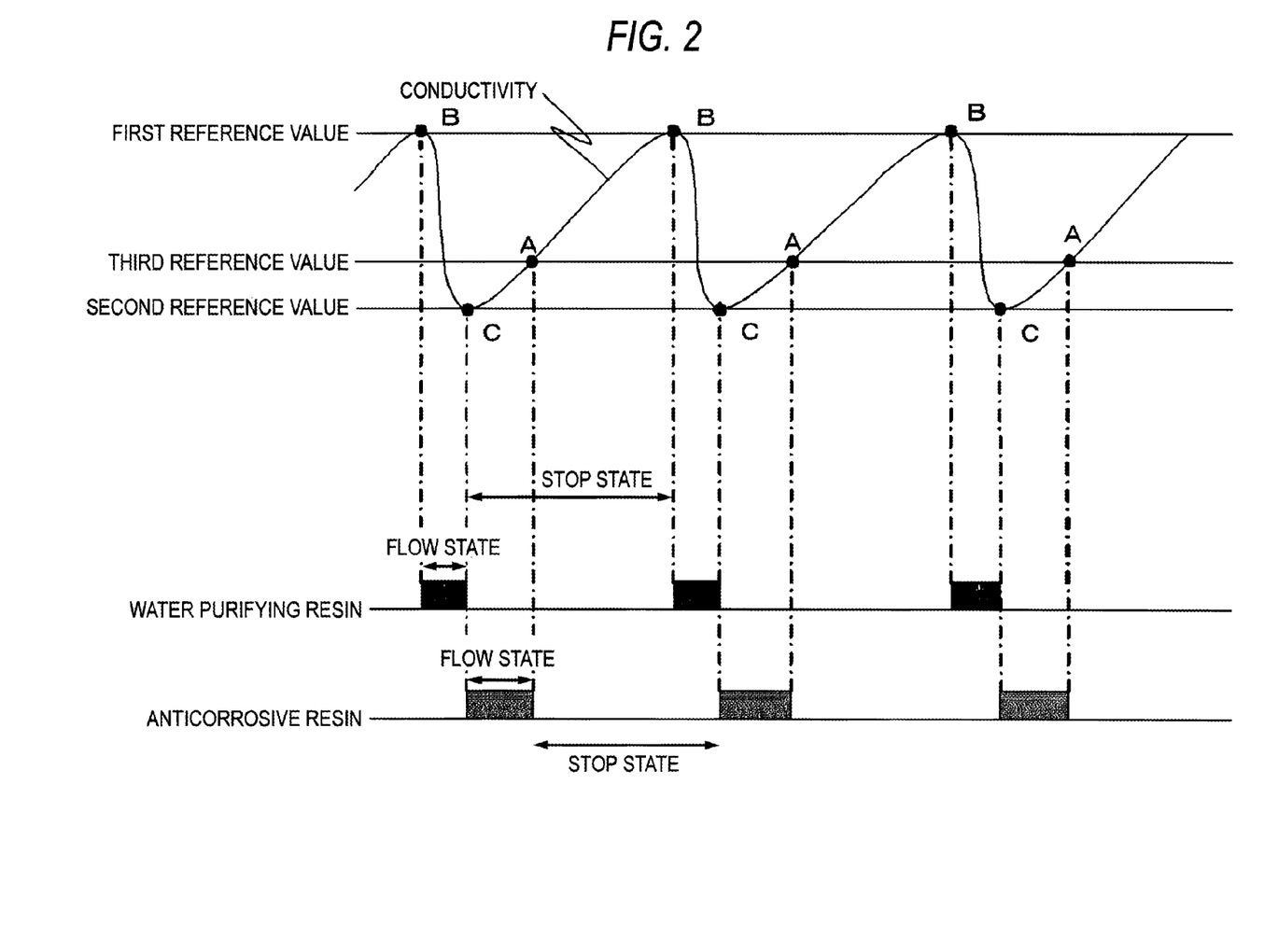
FIG. 2 is a timing chart illustrating flows of a machining liquid into an anticorrosive resin and a water purifying resin.

FIG. 2 shows whether the machining liquid flows into or does not flow into the anticorrosive resin or the water purifying resin, together with a variation in the conductivity of the machining liquid, with a horizontal axis representing time.

In FIG. 2, a curve represents the conductivity of the machining liquid. From the state A in which the machining liquid does not flow into any resin and the conductivity is the third reference value, as time goes on, the conductivity increases. If the conductivity reaches the first reference value (the state B), the machining liquid flows into the water purifying resin such that the conductivity is reduced to the second reference value (the state C).

If the conductivity becomes the second reference value, the flow of the machining liquid into the water purifying resin is stopped, and the machining liquid flows into the anticorrosive resin.

Thereafter, the conductivity gradually increases, and if the conductivity becomes larger than the third reference value, the flow of machining liquid into the anticorrosive ion is stopped (the state A).

Next, embodiments of the present invention will be described.

Figure 3:
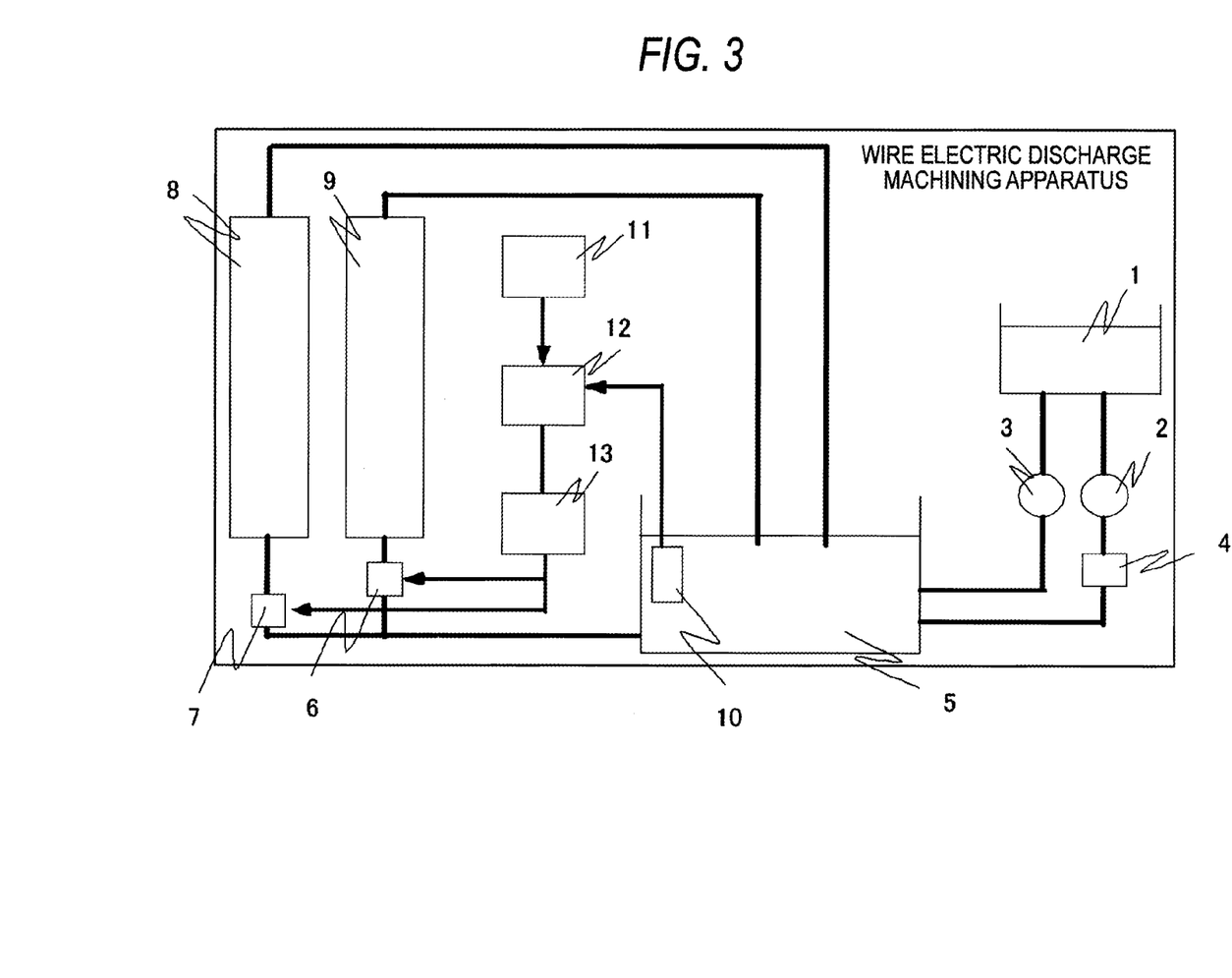
FIG. 3 is a view illustrating a configuration of a wire electric discharge machining apparatus according to a first embodiment.

FIG. 3 is a configuration view illustrating a configuration of a wire electric discharge machining apparatus including a liquid-quality adjusting apparatus of the present invention.

In FIG. 3, a work piece is put in a machining tank 1 filled with a machining liquid, with a gap from a wire electrode, and pulse discharge is performed such that machining progresses.

A first pump 2 makes the machining liquid including sludge due to the machining pass through a filter 4 for filtering such that the sludge is removed, and be sent to and stored in a clear machining-liquid tank 5.

Next, the machining liquid in the clear machining-liquid tank 5 is sent to the machining tank 1 by a second pump 3, and machining is performed.

Also, the machining liquid filled in the clear machining-liquid tank 5 is sent into a water purifying resin 9 through a first flow control unit 6 such that the machining liquid is deionized, and is sent into an anticorrosive resin 8 through a second flow control unit 7 such that ions in the machining liquid are exchanged with anticorrosive ions.

On the basis of a measurement result from a measuring instrument 10 configured to measure the conductivity of the machining liquid filled in the clear machining-liquid tank 5, a comparator 12 compares the conductivity with a first reference value, a second reference value and a third reference value of the conductivity, and a controller 13 performs control on the first flow control unit 6 and the second flow control unit 7 such that the flow of the machining liquid is controlled.

Here, the first reference value, the second reference value, and third reference value for the conductivity are stored in a storage unit 11 in advance.

In the present embodiment, the first reference value, the second reference value, and the third reference value for the conductivity stored in the storage unit 11 are set to values having no influence on electric discharge machining. The reference values satisfy a relation '(FIRST REFERENCE VALUE)≥(THIRD REFERENCE VALUE)>(SECOND REFERENCE VALUE)'. The first reference value is a value in a conductivity range usable in the electric discharge machining, and the second reference value is a value smaller than the first reference value by 2 μS/cm or more, so as to establish the above-mentioned control sequence. If the difference between the second reference value and the first reference value is smaller than 2 µS/cm, the time when the conductivity changes from the second reference value to the first reference value becomes short, and the flow time of the machining liquid into the anticorrosive resin becomes long. Therefore, it is impossible to expect extension of the life of the anticorrosive resin.

The third reference value is a value necessary for obtaining the anticorrosive effect between the first reference value and the second reference value. As an example, it is possible to set the first reference value, the second reference value, and the third reference value to 12 µS/cm, 8 µS/cm, and 9.5 µS/cm, respectively.

Next, an operation will be described.

The conductivity of the machining liquid filled in the clear machining-liquid tank 5 is measured by the measuring instrument 10 disposed in the clear machining-liquid tank 5, and the measured conductivity is output to the comparator 12.

The comparator 12 compares the measured value input from the measuring instrument 10 with the reference values stored in the storage unit 11. If the conductivity of the machining liquid is larger than the first reference value, the comparator 12 determines that the conductivity is not appropriate for the wire electric discharge machining, and a process of making the machining liquid flow into the water purifying resin 9 is performed so as to reduce the conductivity. If the machining liquid simultaneously flows into the water purifying resin 9 and the anticorrosive resin 8, the anticorrosive ions which have substituted for the ions in the machining liquid in the anticorrosive resin 8 are consumed by the water purifying resin 9. As a result, the efficiency of exchange of anticorrosive ions becomes worse. For this reason, while the machining liquid flows into the water purifying resin 9, the machining liquid is stopped from flowing into the anticorrosive resin 8.

If the machining liquid flows into the water purifying resin 9, the conductivity is reduced, and if the conductivity of the machining liquid becomes smaller than the second reference value, the flow of the machining liquid into the water purifying resin 9 is stopped, and the machining liquid is made flow into the anticorrosive resin 8 such that anticorrosive ions, $NO_2^-$, substitute for negative ions in the machining liquid. As a result, the anticorrosive effect on an iron-based metal is obtained.

If the flow of the machining liquid into the water purifying resin 9 is stopped, the conductivity increases, and if the conductivity becomes larger than the third reference value, the first flow control unit 6 and the second flow control unit 7 are controlled such that the flow of the machining liquid into the anticorrosive resin 8 is stopped. Here, it is the reason to stop the flow of the machining liquid into the anticorrosive resin 8 that since the anticorrosive ions in the machining liquid are not rapidly consumed, it is not necessary to make the machining liquid always flow into the anticorrosive resin 8 such that anticorrosive ions are supplied, and it is necessary to extend the life of the anticorrosive resin 8. In order to avoid an influence of the flow of the machining liquid into the water purifying resin 9 on the consumption of the anticorrosive ions, in a sequence before the machining liquid flows into the water purifying resin 9, the flow of the machining liquid into the anticorrosive resin 8 is stopped.

When the machining liquid flows into the anticorrosive resin 8 by the controller 13, the ions in the machining liquid are replaced with the anticorrosive ions and the machining liquid returns to the clear machining-liquid tank 5, and when the machining liquid flows into the water purifying resin 9 by the controller 13, the machining liquid is deionized and returns to the clear machining-liquid tank 5.

As described above, in the present embodiment, three reference values for the conductivity of the machining liquid are provided, and control on the flows of the machining liquid into the anticorrosive resin 8 and the water purifying resin 9 is performed in accordance with the conductivity of the machining liquid. Therefore, it is possible to secure the sufficient flow time of the machining liquid into the anticorrosive resin 8, necessary for an anticorrosive ion concentration at which the anticorrosive effect can be obtained, while securing the conductivity appropriate for the electric discharge machining. As a result, it is possible to extend the life of the anticorrosive resin 8.

Second Embodiment

Figure 4:
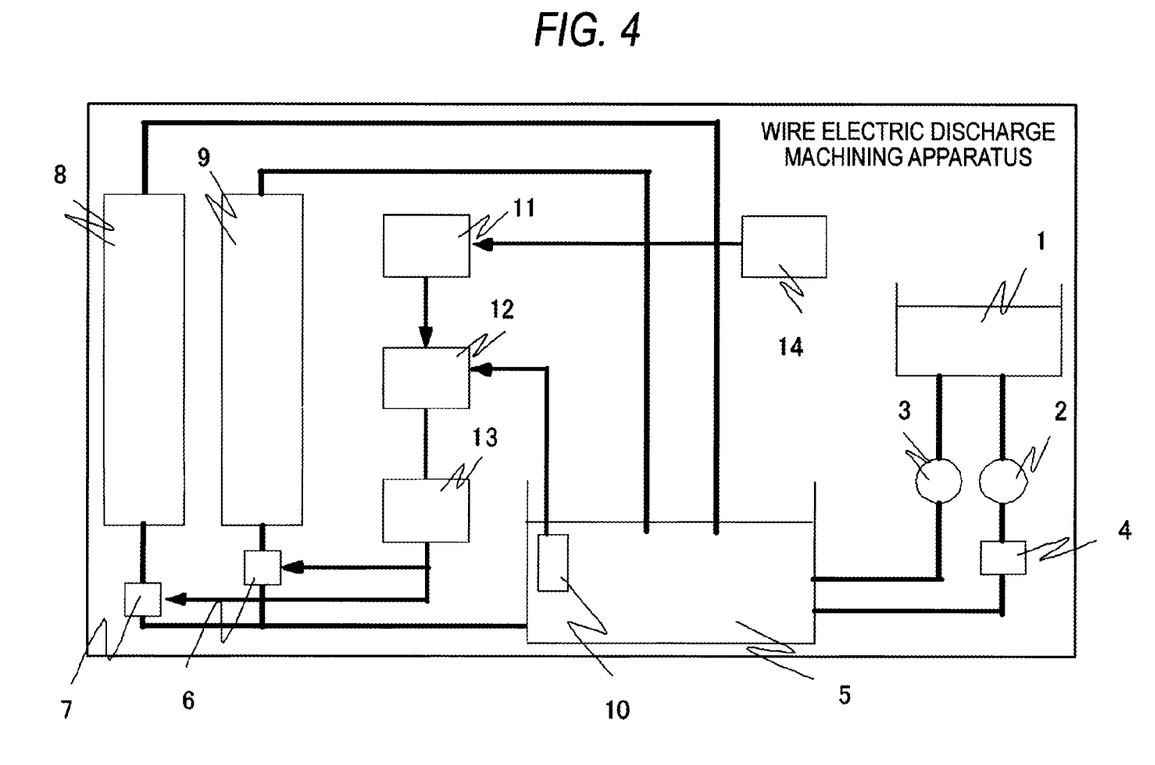
FIG. 4 is a view illustrating a configuration of a wire electric discharge machining apparatus according to a second embodiment.

FIG. 4 shows a wire electric discharge machining apparatus according to a second embodiment of the present invention. The present embodiment is obtained by adding an input part 14 for changing the third reference value to the first embodiment shown in FIG. 3.

In the above-mentioned first embodiment, the third reference value is a specific value stored in the storage unit 11 in advance. The present embodiment is different from the first embodiment in that it is possible to adjust the third reference value stored in the storage unit 11 depending on purposes.

In a case where the first reference value, the second reference value, and the third reference value satisfy the relation described in the first embodiment, if the anticorrosive effect is emphasized, in order to extend the flow time of the machining liquid into the anticorrosive resin, the third reference value is adjusted to a large value close to the first reference value, which is the maximum value, by the input part 14, and if the life of the anticorrosive resin is emphasized, in order to shorten the flow time of the machining liquid into the anticorrosive resin, the third reference value is adjusted to a small value close to the second reference value, which is the minimum value, by the input part 14.

The conductivity at which the machining liquid starts to flow into the anticorrosive resin 8 and which is larger than the second reference value may be stored as a fourth reference value in the storage unit 11. In this case, in a procedure in which the conductivity is reduced, the machining liquid starts to flow into the water purifying resin at the first reference value, and is stopped from flowing into the water purifying resin at the second reference value. If the conductivity is smaller than the second reference value which is the lower limit value, a procedure of increasing the conductivity is performed. In this procedure, the machining liquid starts to flow into the anticorrosive resin at the fourth reference value equal to or large than the second reference value, and is stopped from flowing into the anticorrosive resin at the third reference value smaller than the first reference value.

The first, second, third, and fourth reference values satisfy a relation '(FIRST REFERENCE VALUE)≥(THIRD REFERENCE VALUE)>(FOURTH REFERENCE VALUE)≥(SECOND REFERENCE VALUE)'. In general, the second reference value and the fourth reference value are set to the same value. As a means for changing the flow time, the fourth reference value is provided, and at the second reference value which is the lower limit value, the machining liquid does not start to flow into the anticorrosive resin and is stopped from flowing into both of the water purifying resin and the anticorrosive resin. If the conductivity changes to increase and becomes larger than the fourth reference value, the machining liquid starts to flow into the anticorrosive resin, and at the third reference value, the flow of the machining liquid into the anticorrosive resin is stopped. In a case where the fourth reference value and the second reference value are the same, the present embodiment becomes identical to the first embodiment.

As described above, the input part 14 is provided such that it is possible to adjust the third and fourth reference values in accordance with purposes. Therefore, in cases where the anticorrosive effect or the life of the resin is emphasized according to work pieces, it is possible to change the flow time of the machining liquid into the anticorrosive resin, and to more efficiently make the machining liquid flow into the anticorrosive resin.

Third Embodiment

Figure 5:
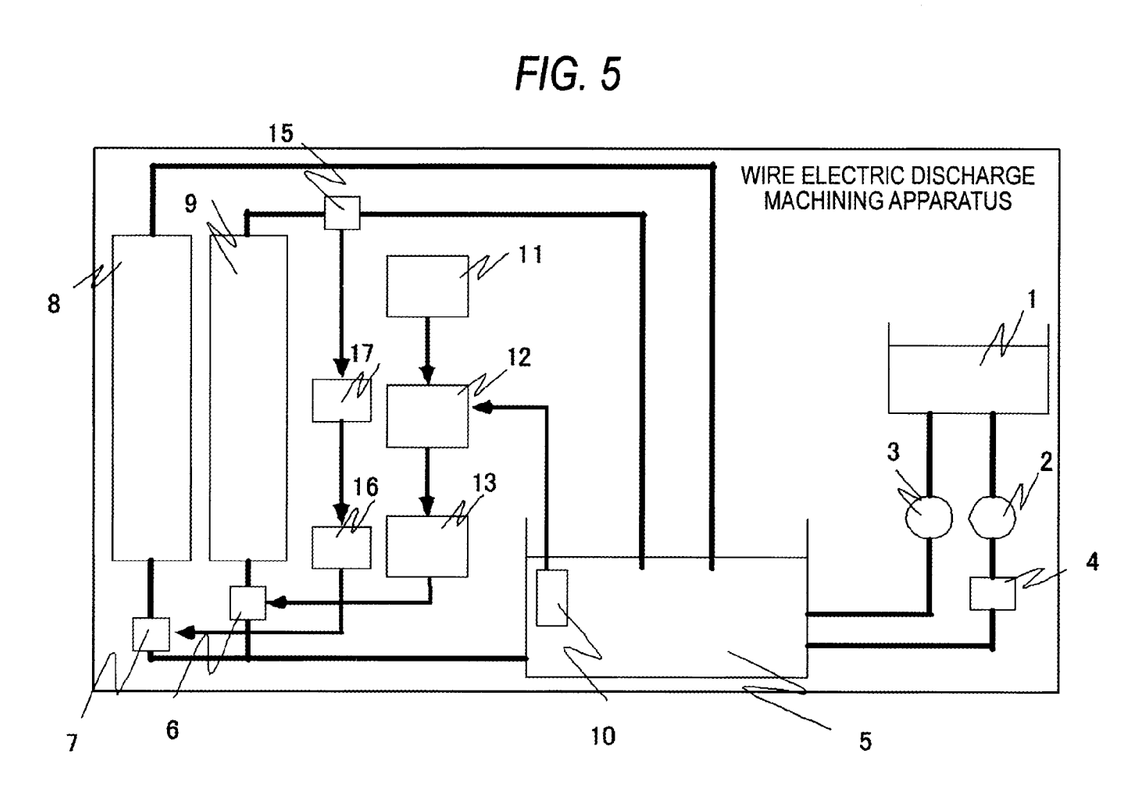
FIG. 5 is a view illustrating a configuration of a wire electric discharge machining apparatus according to a third embodiment.

FIG. 5 shows a wire electric discharge machining apparatus according to a third embodiment of the present invention.

The present embodiment is obtained by adding a flow sensor 15 for sensing the flow state of the machining liquid into the water purifying resin 9, a second controller 16 for controlling the flow control unit 7 for the anticorrosive resin 8, and a timer 17 to the first embodiment shown in FIG. 3.

The machining liquid is made flow into the water purifying resin 9, similarly to the first embodiment. However, the present embodiment is different from the first embodiment in that not the controller 13 but the second controller 16 controls the flow of the machining liquid into the anticorrosive resin 8 in accordance with an output of the flow sensor 15 which is disposed on a pipe line for the water purifying resin 9.

Similarly to the first embodiment, the wire electric discharge machining apparatus according to the third embodiment makes the machining liquid flow into the water purifying resin 9 if the conductivity of the machining liquid becomes larger than the first reference value stored in the storage unit 11, and stops the flow of the machining liquid into the water purifying resin 9 if the conductivity of the machining liquid becomes smaller than the second reference value.

The flow sensor 15 senses the flow state of the machining liquid into the water purifying resin 9, and outputs a signal. If the flow of the machining liquid into the water purifying resin 9 is stopped, the second controller 16 makes the machining liquid flow into the anticorrosive resin 8. Then, if a predetermined time, for example, about 20 minutes to 30 minutes, set in the timer 17 elapses, the second controller 16 controls the second flow control unit 7 such that the flow of the machining liquid into the anticorrosive resin 8 is stopped. The value of the timer is set to a flow time necessary for obtaining the anticorrosive effect, on the basis of a relation between a prior flow time and an anticorrosive ion concentration according to the prior flow time.

As described above, it is possible to perform control the flow of the machining liquid into the anticorrosive resin 8 in accordance with the flow state of the machining liquid into the water purifying resin 9. Therefore, it is possible to secure the sufficient flow time of the machining liquid into the anticorrosive resin 8, necessary for an anticorrosive ion concentration at which the anticorrosive effect can be obtained, while securing the conductivity appropriate for the electric discharge machining. As a result, it is possible to extend the life of the anticorrosive resin 8.

Further, it is unnecessary to store the third reference value in the storage unit 11 and it is possible to more easily control the flow of the machining liquid on the basis of the output of the sensor, as compared to the first embodiment.

Fourth Embodiment

Figure 6:
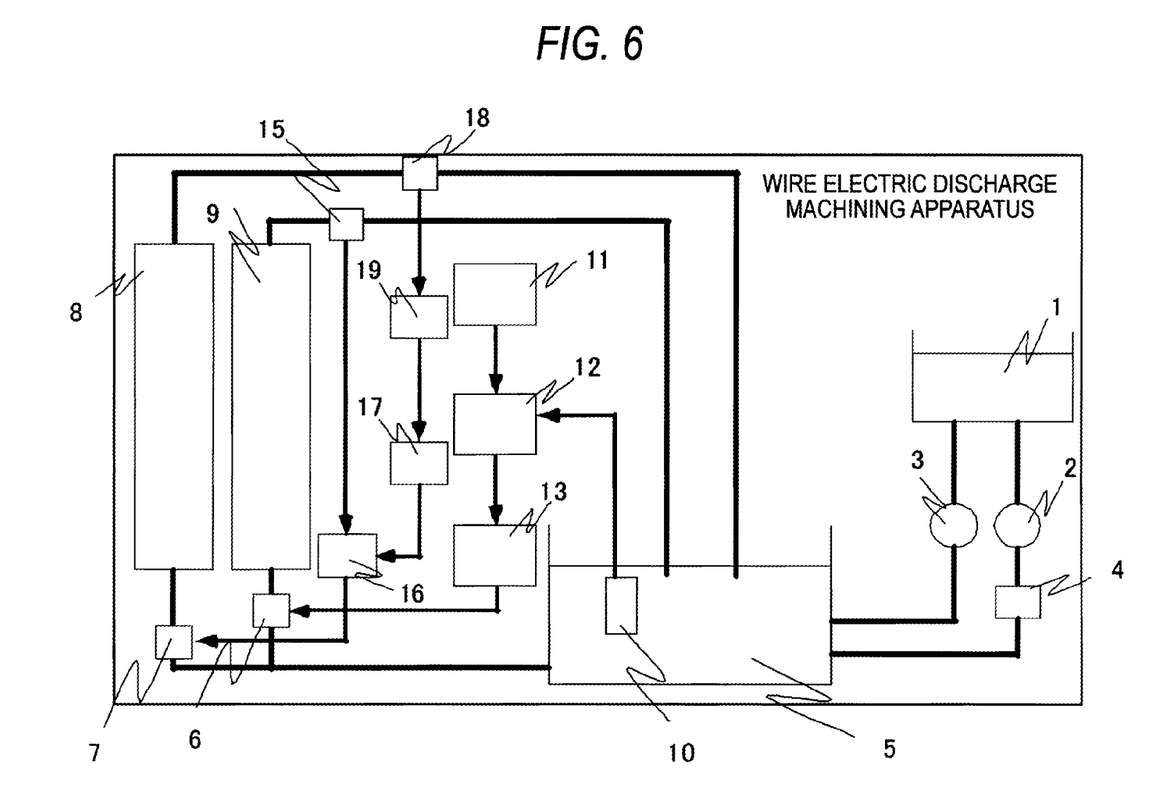
FIG. 6 is a view illustrating a configuration of a wire electric discharge machining apparatus according to a fourth embodiment.

FIG. 6 is a view illustrating a configuration of a wire electric discharge machining apparatus according to a fourth embodiment of the present invention.

The present embodiment is obtained by adding an integrated-flow-amount recording unit 18 for recording an integrated flow amount of the machining liquid into the anticorrosive resin 8, and a time setting unit 19 for setting the time of the timer 17 according to an output of the integrated-flow storage unit 18, to the third embodiment shown in FIG. 5.

The anticorrosive ions supported by the anticorrosive resin decrease as the integrated flow amount increases, such that the anticorrosive ion concentration decreases as time goes on after the machining liquid starts to flow into the anticorrosive resin. For this reason, it is desirable to gradually increase the time to be set in the timer 17 as a flow-amount changing means such that the second controller 16 increases the flow.

Similarly to the third embodiment, the wire electric discharge machining apparatus according to the fourth embodiment controls the flow of the machining liquid into the water purifying resin 9 in accordance with the measured conductivity of the machining liquid.

If the flow sensor 15 detects that the flow of the machining liquid into the water purifying resin 9 has been stopped, the second controller 16 makes the machining liquid start to flow into the anticorrosive resin 8, and the flow of the machining liquid into the anticorrosive resin 8 continues for the time of the timer which has been set by the time setting unit 19 such that the flow time lengthens as the integrated flow amount from the integrated-flow-amount recording unit 18 increases.

If the integrated flow amount increases, the amount of substitutable anticorrosive ions in the anticorrosive resin 8 for a constant flow amount decreases. Therefore, if the flow time lengthens, it is possible to secure a predetermined ion concentration.

If the flow time set in accordance with the output of the integrated-flow-amount recording unit 18 by the time setting unit 19 elapses, the second flow control unit 7 is controlled such that the flow of the machining liquid into the anticorrosive resin 8 is stopped. It goes without saying that the integrated flow amount is reset if resin exchange is performed.

As described above, the anticorrosive ion concentration which can be obtained from the anticorrosive resin varies according to an integrated flow time. Therefore, if the integrated flow amount of the machining liquid into the anticorrosive resin 8 is recorded, and the flow time is set to be short while the integrated flow amount is small and to increase as the integrated flow amount increases, it is possible to more efficiently make the machining liquid flow into the anticorrosive resin 8, as compared to the third embodiment.

Fifth Embodiment

Figure 7:
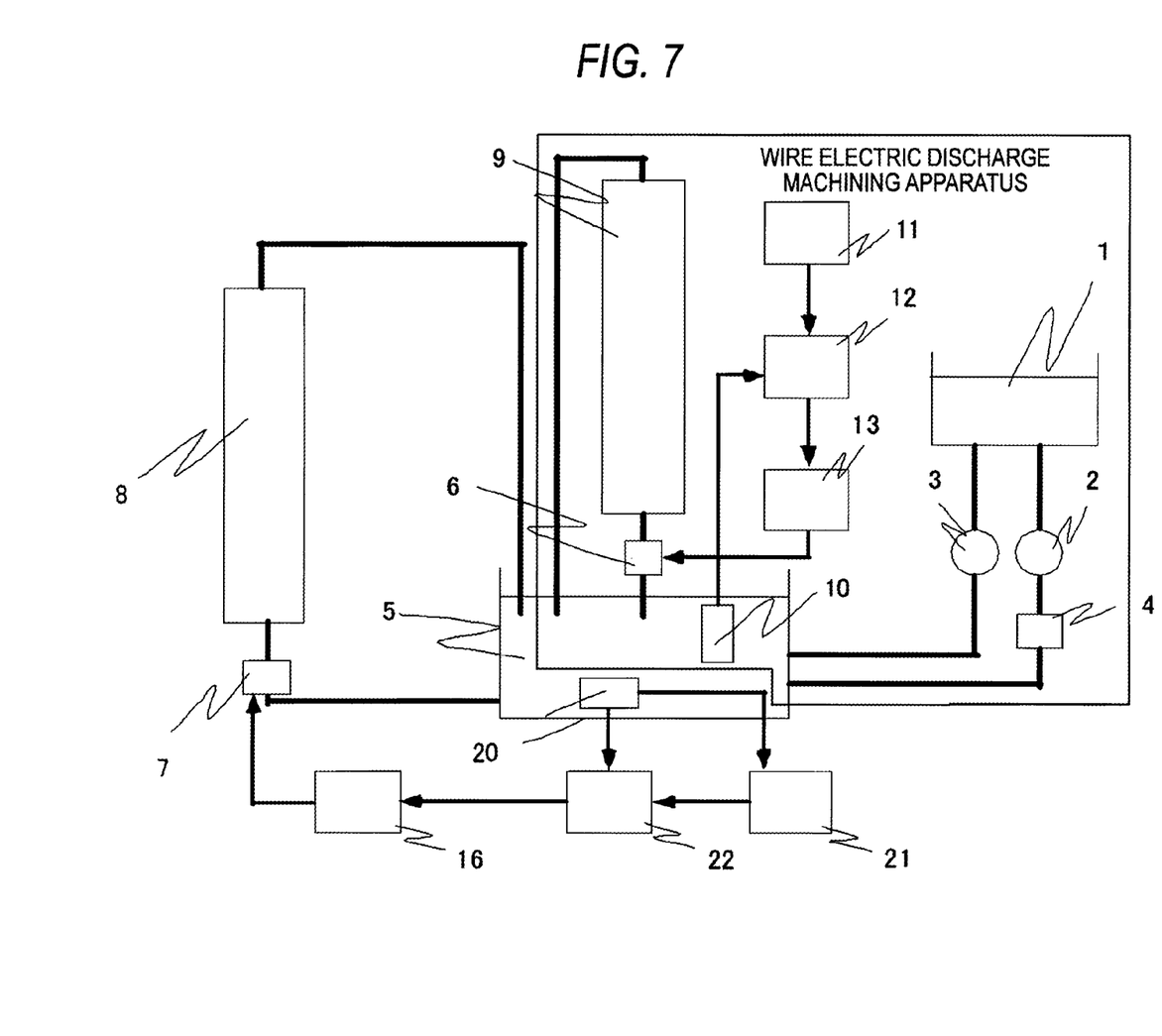
FIG. 7 is a view illustrating a configuration of a liquid-quality adjusting apparatus according to a fifth embodiment.

FIG. 7 shows a liquid-quality adjusting apparatus according to a fifth embodiment of the present invention.

In the fifth embodiment, the water purifying resin 9 is a portion of the wire electric discharge machining apparatus, whereas the anticorrosive resin 8 is provided separately and independently from the wire electric discharge machining apparatus. Further, the anticorrosive resin 8 is related to a second measuring instrument 20, a second storage unit 21, and a second comparator 22.

Similarly to the first embodiment, the controller 13 controls the first flow control unit 6 such that if the conductivity of the machining liquid reaches the first reference value which is the maximum value of measurable conductivity, the machining liquid starts to flow into the water purifying resin 9, and if the conductivity decreases and reaches the second reference value, the flow of the machining liquid into the water purifying resin 9 is stopped.

The conductivity of the machining liquid measured by the second measuring instrument 20 is output to the second storage unit 21 and the second comparator 22.

Similarly to the first embodiment, in a case where the first reference value and the second reference value for controlling the flow of the machining liquid into the water purifying resin 9 are obvious, a value between the first reference value and the second reference value is set as the third reference value, and the first, second, and third reference values are stored in the second storage unit 21.

In a case where the first reference value and the second reference value are not obvious, that is, a method of controlling the resistivity value of the machining liquid is not obvious, among the conductivities which are applicable to the electric discharge machining and are measurable by the second measuring instrument 20, the maximum value is stored as the first reference value and the minimum value is stored as the second reference value, and a value larger than the second reference value by, for example, 2 μS/cm is stored as the third reference value.

In this case, the third reference value is set within a range which does not exceed the first reference value.

The second comparator 22 compares the value measured by the second measuring instrument 20 with the first, second, and third reference values stored in the second storage unit 21, and transmits an output to the second controller 16.

The second controller 16 performs control on the basis of the output of the second comparator 22, such that if the conductivity of the machining liquid becomes smaller than the second reference value, the second controller 16 makes the machining liquid flow into the anticorrosive resin 8, and if the conductivity of the machining liquid becomes larger than the third reference value, the flow of the machining liquid into the anticorrosive resin 8 is stopped.

As described above, independently form the wire electric discharge machining apparatus, the anticorrosive resin 8 includes the measuring instrument, the storage unit, the comparator, and the controller, and can store the first reference value, the second reference value, and the third reference value by itself. Therefore, it is possible to obtain the anticorrosive effect by providing the liquid-quality adjusting apparatus according to the present embodiment to an existing wire electric discharge machining apparatus having no anticorrosive resin.

Sixth Embodiment

Figure 8:
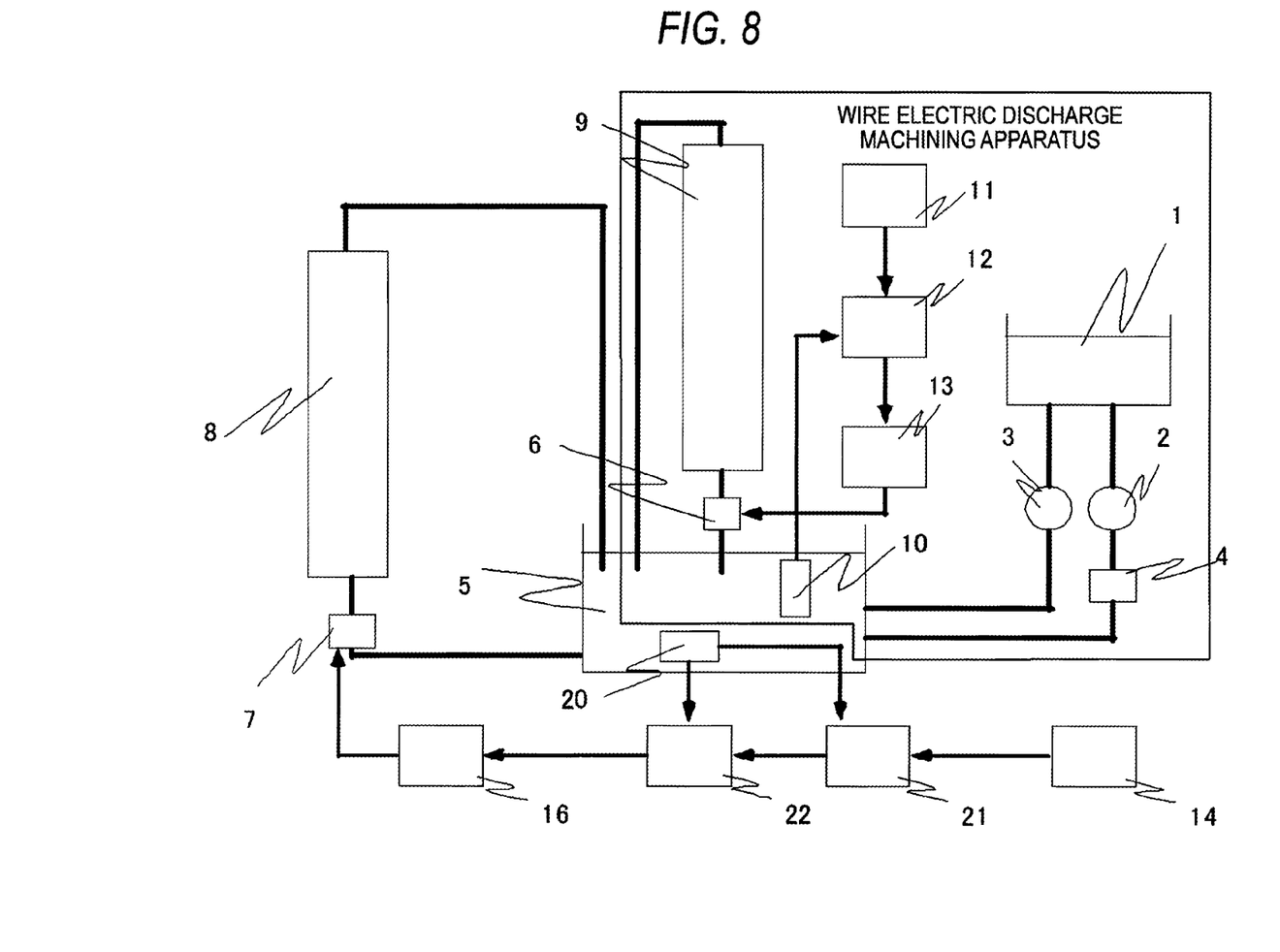
FIG. 8 is a view illustrating a configuration of a liquid-quality adjusting apparatus according to a sixth embodiment.

FIG. 8 shows a liquid-quality adjusting apparatus according to a sixth embodiment of the present invention.

The present embodiment is obtained by adding an input part 14 for changing the third reference value to the fifth embodiment shown in FIG. 7.

In the above-mentioned fifth embodiment, the third reference value is a specific value. Similarly the second embodiment, the present embodiment is different from the first embodiment in that it is possible to adjust the third reference value stored in the second storage unit 21 for the purposes.

In a case where the first reference value, the second reference value, and the third reference value satisfy the relation described in the first embodiment, if the anticorrosive effect is emphasized, in order to extend the flow time of the machining liquid into the anticorrosive resin, the third reference value is adjusted to a large value close to the first reference value, which is the maximum value, by the input part 14, and if the life of the anticorrosive resin is emphasized, in order to shorten the flow time of the machining liquid into the anticorrosive resin, the third reference value is adjusted to a small value close to the second reference value, which is the minimum value, by the input part 14.

The conductivity at which the machining liquid starts to flow into the anticorrosive resin 8 and which is larger than the second reference value may be stored as a fourth reference value in the storage unit 11. In this case, similarly to the second embodiment, the first, second, third, and fourth reference values satisfy the relation '(FIRST REFERENCE VALUE)≥(THIRD REFERENCE VALUE)>(FOURTH REFERENCE VALUE)≥(SECOND REFERENCE VALUE)'. In general, the second reference value and the fourth reference value are set to the same value.

As described above, the input part 14 is provided such that it is possible to adjust the third reference value depending on purposes. Therefore, in cases where the anticorrosive effect or the life of the resin is emphasized according to work pieces, it is possible to change the flow time of the machining liquid into the anticorrosive resin, and to efficiently make the machining liquid flow into the anticorrosive resin 8.

Seventh Embodiment

Figure 9:
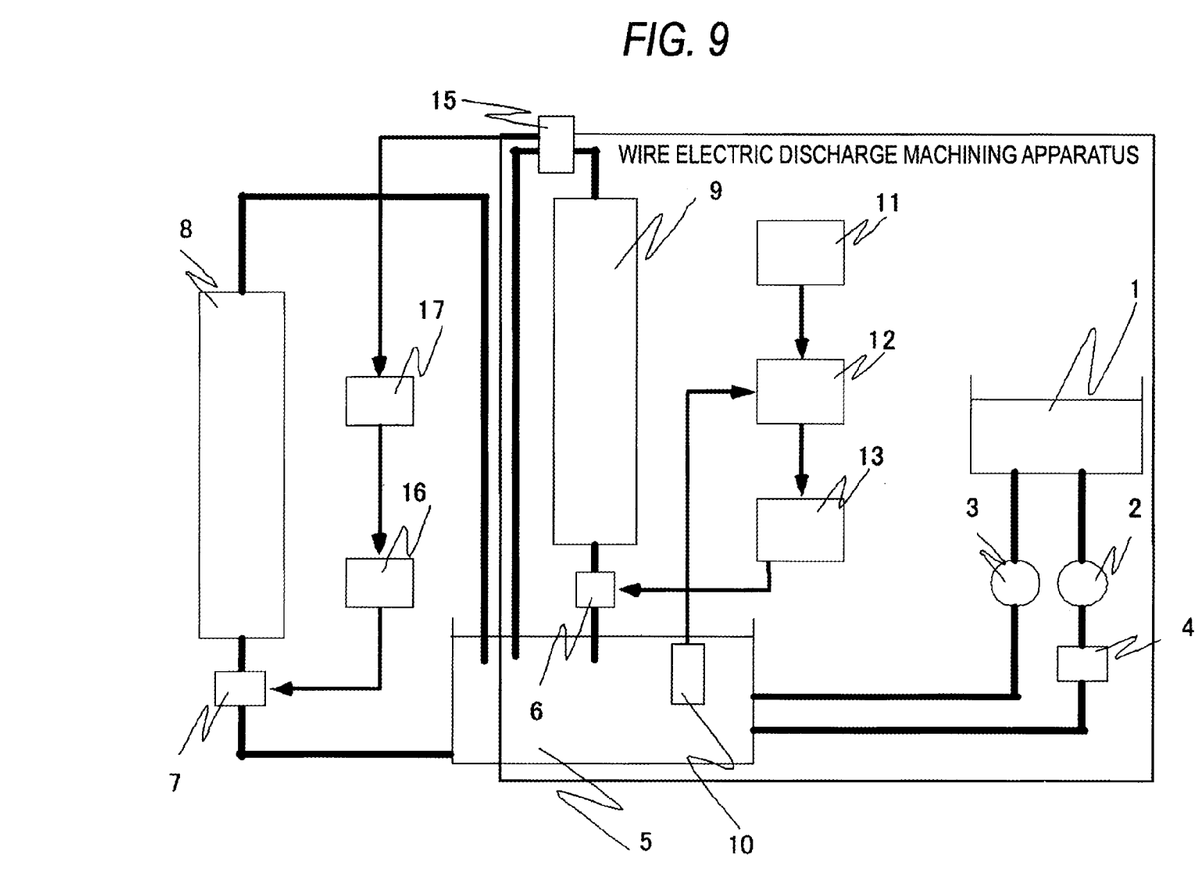
FIG. 9 is a view illustrating a configuration of a liquid-quality adjusting apparatus according to a seventh embodiment.

FIG. 9 shows a liquid-quality adjusting apparatus according to the seventh embodiment of the present invention. Similarly to the fifth embodiment, in the present embodiment, the water purifying resin 9 is a portion of the wire electric discharge machining apparatus, whereas the anticorrosive resin 8 is provided separately and independently from the wire electric discharge machining apparatus. Further, the anticorrosive resin 8 is related to a flow sensor 15 for sensing the flow state of the machining liquid into the water purifying resin 9, a timer 17 for measuring the flow time of the machining liquid into the anticorrosive resin 8, and a second controller 16 for controlling the second flow control unit 7.

The flow sensor 15, the second controller 16, and the timer 17 are set similarly to the third embodiment.

The flow sensor 15 senses the flow state of the machining liquid into the water purifying resin 9, and outputs a signal. If the flow of the machining liquid into the water purifying resin 9 is stopped, the second controller 16 makes the machining liquid flow into the anticorrosive resin 8. Thereafter, if a predetermined time, for example, about 20 minutes to 30 minutes set in the timer 17 elapses, the second controller 16 controls the second flow control unit 7 such that the flow of the machining liquid into the anticorrosive resin 8 is stopped.

As described above, the flow sensor 15 is provided on a pipe line for the water purifying resin 9, and the flow sensor 15 and the timer 17 take place of the measuring instrument, the storage unit and the comparator. Therefore, the same effect as that of the fifth embodiment is obtained and the apparatus configuration becomes simple.

Eighth Embodiment

Figure 10:
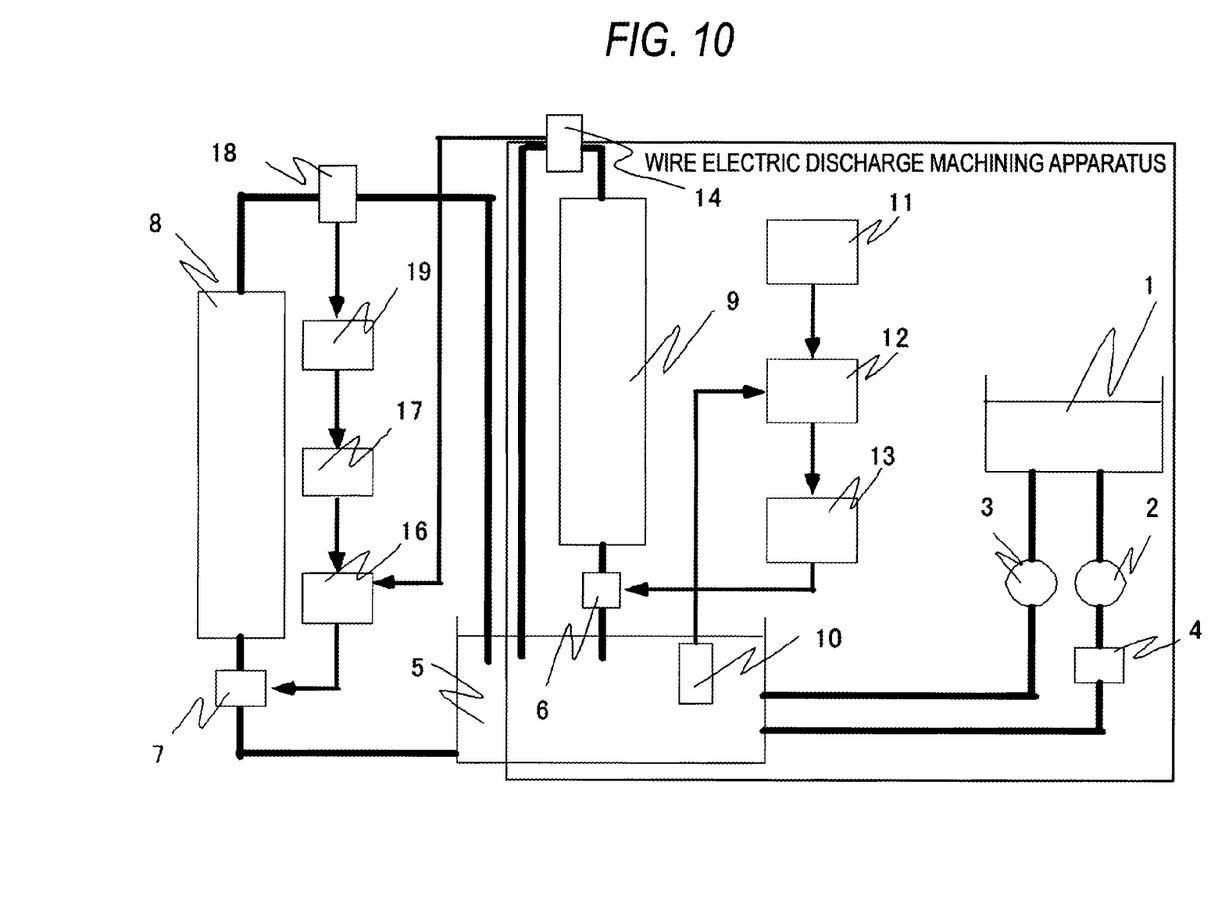
FIG. 10 is a view illustrating a configuration of a liquid-quality adjusting apparatus according to an eighth embodiment.

FIG. 10 shows a liquid-quality adjusting apparatus according to an eighth embodiment of the present invention.

The present embodiment is obtained by adding an integrated-flow-amount recording unit 18 for recording the integrated flow amount of the machining liquid into the anticorrosive resin 8, and a time setting unit 19 for setting a flow time of the machining liquid into the anticorrosive resin, to the apparatus configuration of the seventh embodiment. Further, the integrated-flow-amount recording unit 18 and the time setting unit 19 are set similarly to the fourth embodiment.

The anticorrosive ions supported by the anticorrosive resin decreases as the integrated flow amount increases, such that the anticorrosive ion concentration decreases as time go on after the machining liquid starts to flow into the anticorrosive resin. For this reason, the time of the timer 17 is set such that the flow time increases as the integrated flow amount from the integrated-flow-amount recording unit 18 increases.

Similarly to the seventh embodiment, the wire electric discharge machining apparatus according to the eighth embodiment performs control in accordance with the measured conductivity of the machining liquid, such that the machining liquid flows into the water purifying resin 9.

The second controller 16 controls the second flow control unit 7 such that if the flow sensor 15 senses that the flow of the machining liquid into the water purifying resin 9 has been stopped, the machining liquid starts to flow into the anticorrosive resin 8, and if the flow time set on the basis of the output of the integrated-flow-amount recording unit 18 by the time setting unit 19 elapses, the flow of the machining liquid into the anticorrosive resin 8 is stopped.

As described above, the integrated-flow-amount recording unit 18 is provided on a pipe line for the anticorrosive resin 8, such that it is possible to determine the flow time of the machining liquid into the anticorrosive resin 8. Therefore, it is possible to more efficiently make the machining liquid flow into the anticorrosive resin 8 while obtaining the same effects as those of the seventh embodiment.

Ninth Embodiment

Figure 11:
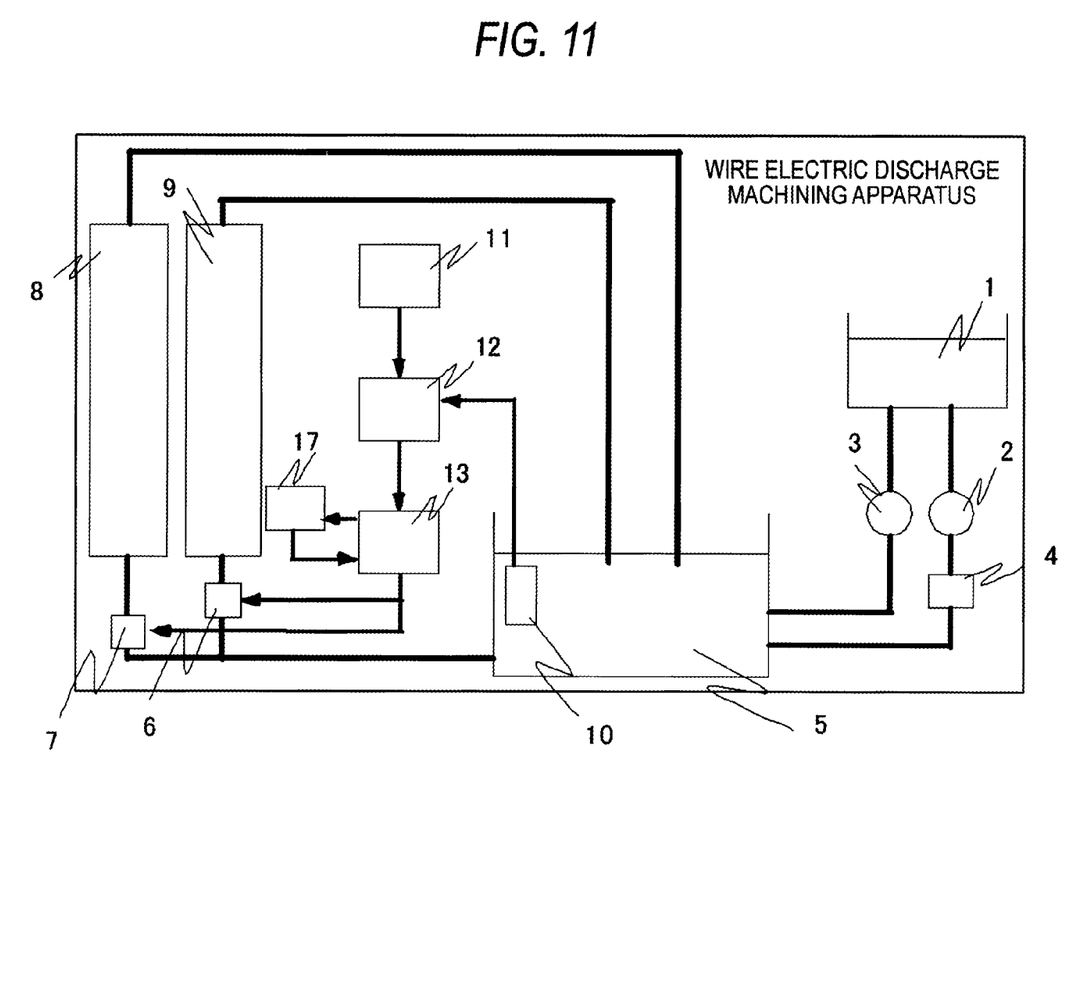
FIG. 11 is a view illustrating a configuration of a wire electric discharge machining apparatus according to a ninth embodiment.

FIG. 11 is a view illustrating a configuration of a wire electric discharge machining apparatus according to a ninth embodiment of the present invention.

The present embodiment is obtained by providing a timer 17 to the first embodiment shown in FIG. 3. If the conductivity of the machining liquid measured by the measuring instrument 10 is larger than the third reference value such that the machining liquid does not flow into any of the anticorrosive resin 8 and the water purifying resin 9, the conductivity of the machining liquid gradually increases.

In a case where a work piece, which has copper attached thereon by the wire electrode and a roughly processed surface having a large area, excessively consumes the anticorrosive ions in the machining tank in the procedure in which the conductivity increases, the anticorrosive ions having an influence on the conductivity decreases such that the increase of the conductivity is suppressed. As a result, the time until the conductivity reaches the first reference value becomes very long.

Therefore, although it is impossible to secure the anticorrosive ion concentration at which the anticorrosive effect can be obtained, a situation in which it is impossible to supply anticorrosive ions occurs.

For this reason, in a case where the conductivity does not reach the first reference value within the predetermined time within which the anticorrosive ion concentration is not extremely reduced and which is experimentally obtained and is set in the timer 17, the controller 13 forcibly performs control such that the machining liquid flows into the water purifying resin 9.

The machining liquid may flow into the anticorrosive resin 8 until the conductivity reaches the first reference value. This is because, if the life of the anticorrosive resin 8 is considered, it is desirable to make the machining liquid flow into the anticorrosive resin 8 after the conductivity is reduced by the water purifying resin 9.

The time of the timer 17 is set in consideration of a ratio of the flow time of the machining liquid into the anticorrosive resin 8 to an entire cycle.

It is experimentally known that the time of a transition from the state B to the state C in which the conductivity is reduced by the water purifying resin 9, and the time of a transition from the state C to the state A in which the anticorrosive ions are supplied are almost constant. However, the time of a transition from the state A to the state B varies from 1 hour to 24 hours or more in accordance with the surrounding environment or conditions.

Except for a case where the transition from the state A to the state B takes a very short time of 1 hour or less, it is possible to determine the flow time of the machining liquid into the anticorrosive resin in one control cycle in accordance with the time set in the timer.

If a work piece is subject to general rough processing, it can be considered that the conductivity rarely increases to the first reference value within 1 hour. If it is assumed that the time of the transition from the state B to the state C is 10 minutes and the time of the transition from the state C to the state A is 20 minutes, it is may be said that, in a case where the value of the timer is set to 10 minutes, a ratio of the flow time of the machining liquid into the anticorrosive resin to one cycle becomes ½ such that the life of the anticorrosive resin becomes twice that of a case where the machining liquid always flows into the anticorrosive resin.

In a case where the conductivity slowly increases, as the time of the timer decreases, although it is possible to secure the anticorrosive ion concentration at which the anticorrosive effect can be obtained, the life of the anticorrosive resin decreases.

INDUSTRIAL APPLICABILITY

The present invention is suitable to be applied to a wire electric discharge machining apparatus.

DESCRIPTION OF REFERENCE NUMERAL 1 machining tank
2 first pump
3 second pump
4 filter
5 clear machining-liquid tank
6 first flow control unit
7 second flow control unit
8 anticorrosive resin
9 water purifying resin
10 measuring instrument
11 storage unit
12 comparator
13 controller
14 input part
15 flow sensor
16 second controller
17 timer
18 integrated flow-amount recording unit
19 time setting unit
20 second measuring instrument
21 second storage unit
22 second comparator

The invention claimed is:
1. A liquid-quality adjusting apparatus comprising:
a water purifying part that deionizes a machining liquid;
an anticorrosive part that exchanges ions in the machining liquid with anticorrosive ions;
a conductivity measuring part that measures a measured value of conductivity of the machining liquid;

a storage part that stores in advance a first reference value and a second reference value which are an upper limit value and a lower limit value of conductivity of the machining liquid applicable to machining, respectively, and a third reference value which is between the first reference value and the second reference value; and a control part that controls a flow of the machining liquid into the water purifying part or the anticorrosive part on the basis of the reference values stored in the storage part and the measured value of the conductivity of the machining liquid measured by the conductivity measuring part, wherein the control part is configured to perform control such that in response to determining that the conductivity of the machining liquid is larger than the first reference value, the machining liquid flows only into the water purifying part, in response to determining that the conductivity of the machining liquid becomes smaller than the second reference value, the flow of the machining liquid into the water purifying part is stopped and the machining liquid flows into only the anticorrosive part, and in response to determining that the conductivity of the machining liquid becomes larger than the third reference value, the flow of the machining liquid into the anticorrosive part is stopped.

2. The liquid-quality adjusting apparatus according to claim 1, further comprising:

an input part that changes the third reference value so as to adjust control of a flow of the machining liquid into the anticorrosive part.

3. The liquid-quality adjusting apparatus according to claim 1, wherein:

the control part is configured to perform control, such that, after the conductivity exceeds the third reference value, in response to determining that the conductivity of the machining liquid does not exceed the first reference value when a predetermined time elapses or in response to determining that the conductivity exceeds the first reference value within a predetermined time, the machining liquid flows only into the water purifying part, in response to determining that the conductivity of the machining liquid becomes smaller than the second reference value, the flow of the machining liquid into the water purifying part is stopped and the machining liquid is made flow only into the anticorrosive part, and in response to determining that the conductivity of the machining liquid becomes larger than the third reference value, the flow of the machining liquid into the anticorrosive part is stopped.

4. A liquid-quality adjusting method in a liquid-quality adjusting apparatus including: a water purifying part that deionizes a machining liquid; an anticorrosive part that exchanges ions in the machining liquid with anticorrosive ions; a conductivity measuring means that measures a measured value of conductivity of the machining liquid; a storage part that stores in advance a first reference value and a second reference value which are an upper limit value and a lower limit value of conductivity of the machining liquid applicable to machining, respectively, and a third reference value which is between the first reference value and the second reference value; and a control part that controls a flow of the machining liquid into the water purifying part or the anticorrosive part on the basis of the reference values stored in the storage part and the measured value of the conductivity of the machining liquid measured by the conductivity measuring part, the method characterized in that, control is performed such that, in response to determining that the conductivity of the machining liquid is larger than the first reference value, the machining liquid flows only into the water purifying part, in response to determining that the conductivity of the machining liquid becomes smaller than the second reference value, the flow of the machining liquid into the water purifying part is stopped and the machining liquid is made flow only into the anticorrosive part, and in response to determining that the conductivity of the machining liquid becomes larger than the third reference value, the flow of the machining liquid into the anticorrosive part is stopped.

* * * * *